United States Patent [19]

Evett

[11] 4,132,296
[45] Jan. 2, 1979

[54] SHIFT LEVER AND INTEGRAL HANDBRAKE APPARATUS

[76] Inventor: Joel Evett, 64 Broad St., Boston, Mass. 02109

[21] Appl. No.: 858,689

[22] Filed: Dec. 8, 1977

Related U.S. Application Data

[63] Continuation-in-part of Ser. No. 722,685, Sep. 13, 1976.

[51] Int. Cl.² .................. B62K 23/06; B62L 3/02; F16D 13/00
[52] U.S. Cl. ................................. 192/4 R; 74/489
[58] Field of Search ..................... 74/489; 192/4 R

[56] References Cited

U.S. PATENT DOCUMENTS

| | | | |
|---|---|---|---|
| 3,478,617 | 11/1969 | Maeda | 74/489 |
| 3,534,629 | 10/1970 | Schwerdhofer | 74/489 X |
| 3,554,158 | 1/1971 | Shimano et al. | 74/489 X |

FOREIGN PATENT DOCUMENTS

| | | | |
|---|---|---|---|
| 921292 | 1/1947 | France | 74/489 |
| 57807 | 4/1953 | France | 74/489 |
| 1067196 | 1/1954 | France | 74/489 |

Primary Examiner—Allan D. Herrmann
Attorney, Agent, or Firm—Howard Alan Taishoff

[57] ABSTRACT

A shift assembly and integral handbrake apparatus for bicycles is comprised of a handbrake housing on which pivots a handbrake lever. The housing has an interior region formed with a cavity. A slot, defined by an extending flange, is formed on the housing. A shift lever has one end formed as a shift barrel and the other end formed as a finger paddle. The shift barrel is pivotally mounted in the cavity. A portion of the shift lever is placed in the slot causing the finger paddle to extend from the housing. A Bowden cable is coupled to the shift lever. Means places a frictional drag on the shift barrel. Manual pressure on the finger paddle overcomes the drag placed on the shift barrel causing same to pivot. This pivoting results in a relative lengthening or shortening of the Bowden cable. Means locks the frictional drag means at a given predetermined level. The flange provides a comfortable finger stop.

10 Claims, 4 Drawing Figures

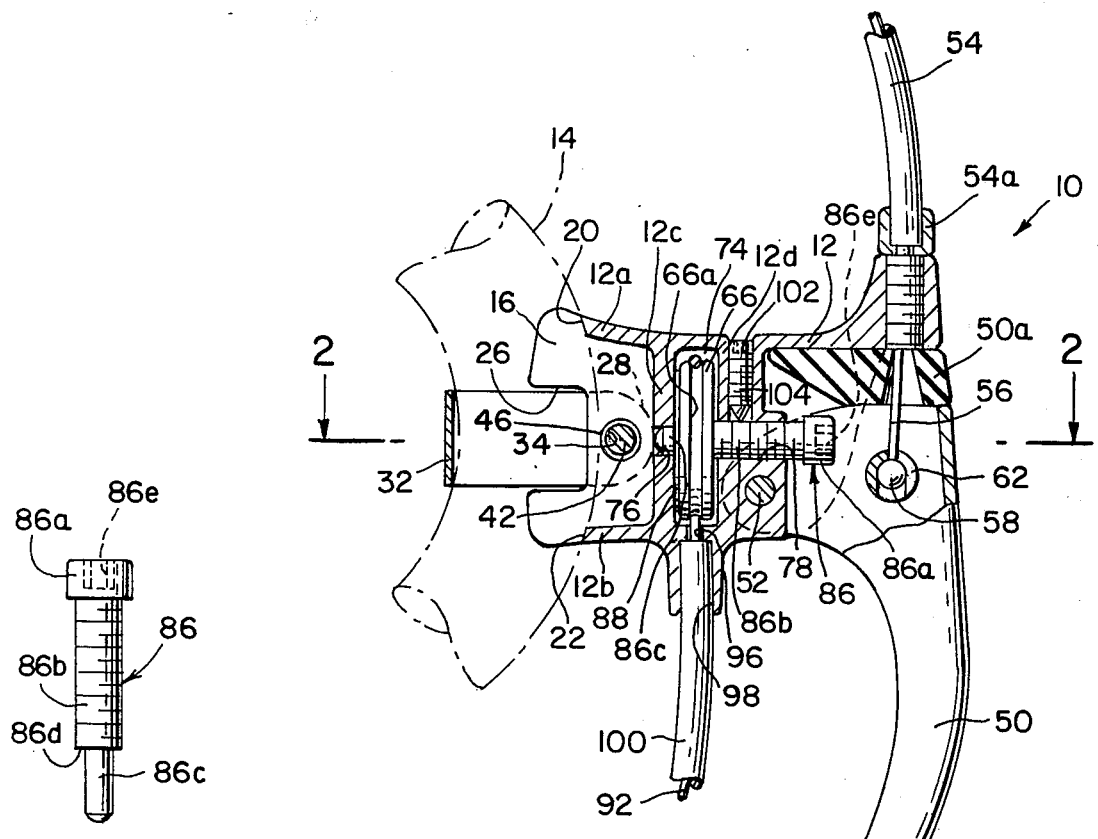
Figure 4
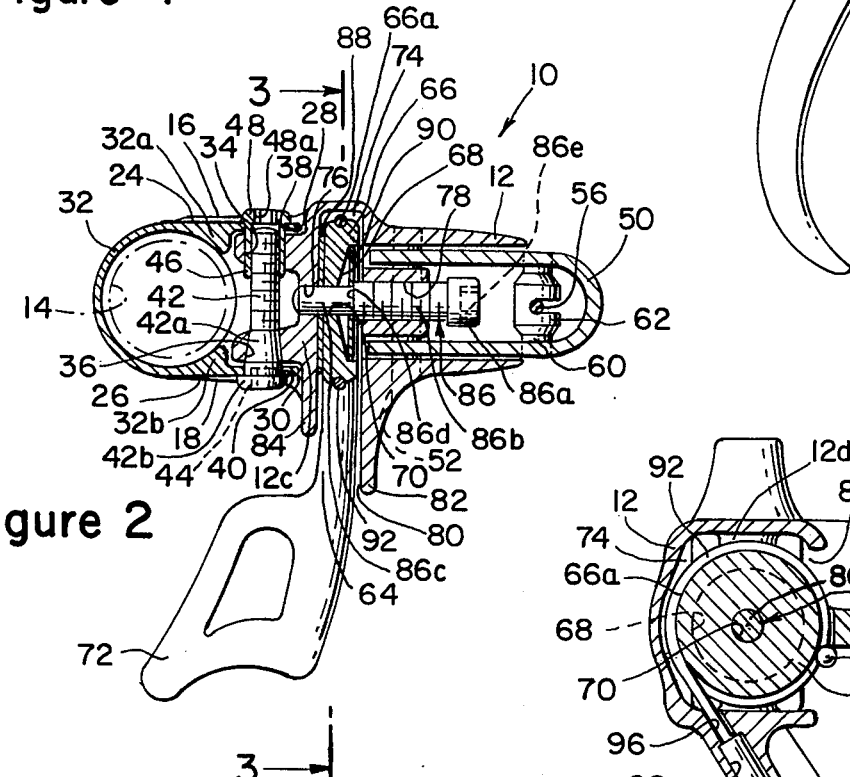
Figure 1
Figure 2
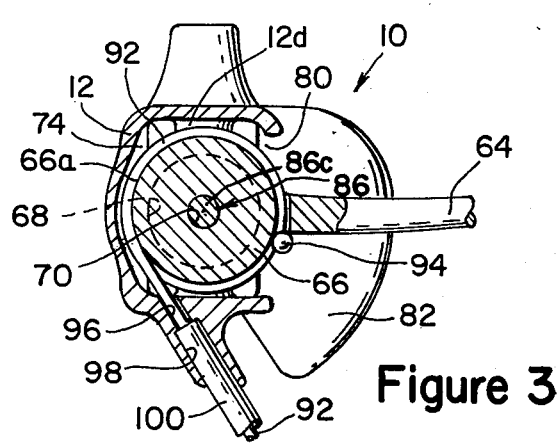
Figure 3

SHIFT LEVER AND INTEGRAL HANDBRAKE APPARATUS

This invention is a continuation-in-part of my co-pending application, Ser. No. 722,685, filed Sept. 13, 1976, now Pat. No. 4,100,820.

The present invention relates to a shift mechanism and handbrake assembly for bicycles, and more particularly, this invention relates to a shift mechanism that is structurally integrated with a handbrake assembly.

The above-mentioned co-pending application discloses a shift lever and handbrake assembly that is constructed as an integral unit. In accordance with this construction, a handbrake support bracket or housing carries a conventional and pivotal handbrake assembly. A novel gear shift lever has one end formed as a shift barrel. The other end of the shift lever flares to form a finger paddle. The shift barrel is rotatively mounted and carried in the handbrake housing such that the finger paddle is caused to extend from the housing. A friction assembly places a preset and controlled drag on the shift barrel. Manual pressure on the finger paddle overcomes the drag placed on the shift barrel causing the shift lever and hence shift barrel to rotate relative to the handbrake housing. A Bowden cable is coupled to the shift lever so that rotation of the shift lever effects a lengthening or shortening of the Bowden cable relative to a Bowden cable jacket. This lengthening or shortening produces a gear change.

There are several advantages that accrue from such an integrated structure. When the shift lever and handbrake lever are joined in one assembly, both levers can be grasped nearly simultaneously. With this construction, the considerable arm "reach" associated with discrete assemblies is eliminated.

In general, the present invention carries forward the integrated construction disclosed in the aforementioned co-pending application. Several improvements are disclosed here, however. One improvement comprises a flange assembly that is integrally formed on the handbrake housing. The flange assembly defines a slot through which is disposed a portion of the shift lever. This flange assembly provides a comfortable finger stop and it prevents or impedes unwanted finger contact with the shift lever. Another improvement includes a means for locking the friction assembly in a given preset condition or at a predetermined level. Because of the relatively severe vibrational environment associated with the bicycle frame, and because the shift lever is subjected to nearly constant pivoting, the drag placed on the shift barrel may tend to "loosen" or ease. The locking means of the present invention overcomes this tendency.

It is therefore an object of the present invention to provide a shift lever and handbrake assembly that is constructed as an integral unit.

It is another object of the present invention to provide an integrated shift lever and handbrake assembly wherein a controlled drag is placed on the shift lever to hold same stationary until moved by manual pressure.

It is a further object of the present invention to provide a flanged housing for an integral shift lever and handbrake assembly wherein the flange provides a comfortable finger stop.

It is a still further object of the present invention to provide a means for placing a controlled drag on a shift assembly for bicycles wherein a lock-mechanism maintains the drag at a predetermined level.

Other objects and features of the present invention will become apparent from the following detailed description considered in connection with the accompanying drawings. It is to be understood, however, that the drawings are designed for purposes of illustration only, and not as a definition of the limits of the invention for which reference should be made to the appending claims.

In the drawings, wherein the same reference numeral denotes the same element throughout the several views:

FIG. 1 is a plan view of one embodiment of the present invention, parts of which are shown in section with the integral apparatus seen attached to the bicycle handlebar;

FIG. 2 is a sectional view taken along line 2—2 of FIG. 1 and looking in the direction of the arrows;

FIG. 3 is a sectional view taken along line 3—3 of FIG. 2 and looking in the direction of the arrows; and, FIG. 4 is an enlarged view of a bolt used in conjunction with the present invention.

More particularly now and referring to the drawings, FIGS. 1 through 4 illustrate one embodiment of the present invention. The integral shift lever and handbrake assembly is indicated generally by reference numeral 10 and it includes a handbrake support bracket or housing 12. That portion of housing 12 that is designed to confront and engage a handlebar 14 includes an upper mounting-skirt 16 and a lower mounting-skirt 18. Housing 12 is further defined by opposed lateral sides 12a and 12b. Each lateral side 12a and 12b terminate in respective seats 20 and 22 that are complementary to the periphery handlebar 14. Upper skirt 16 and lower skirt 18 are each formed with a respective cut-out or strap-accommodating notch 24 and 26. Further, on the external periphery or along the outboard surface of each upper and lower skirt, there is formed a respective strap-receiving land or indentation 28 and 30. Each strap-receiving indentation 28 and 30 is placed adjacent to its respective strap-accommodating notch 24 and 26 such that each notch, so to speak, terminates or feeds into its associated and adjacently placed strap-receiving land. Each notch and land combination is designed to receive the end regions of a mounting-strap or band 32 in a manner that will be described shortly.

Skirts 16 and 18 are each formed with a respective through-aperture 34 and 36 that align and communicate along a common axis. It will be observed that through-aperture or bore 34 has a constant cross-section whereas through-aperture 36 has a conical or tapering cross-section. Further, each through-aperture 34 and 36 is drilled or formed in its respective skirt so as to have an opening located substantially centrally in an associated strap-receiving land 28 and 30.

Mounting-strap 32 is designed to wrap partways around handlebar 14. The longitudinal ends of band or strap 32 fit onto complementary strap-receiving lands 28 and 30 as seen best in FIG. 3. A pair of enlargements 32a and 32b are formed on band 32. Each enlargement is spaced from its respective longitudinal end of the band. And, it will be observed that each enlargement 32a and 32b has a surface that is complementary to the cross-sectional contour of the handlebar, that, in the illustration shown, is substantially circular. The contoured surface of each enlargement 32a and 32b acts as a seat for handlebar 14 when band 32 is caused to tighten firmly about the handlebar. As will be explained shortly, this tightening of band 32 operates to hold housing 12 securely on handlebar 14.

Each respective longitudinal end of band 32 is formed with an associated aperture 38 and 40. Each aperture 38 and 40 is sized substantially complementary to each of the openings associated with skirt-bores 34 and 36 as these bore-openings define themselves in corresponding lands 28 and 30. And, as will be observed from viewing FIG. 2, apertures 38 and 40 are appropriately positioned on a respective end of band 32 such that when a given end of band 32 is received on its corresponding complementary land 28 and 30, apertures 38 and 40 generally align over associated skirt-bores 34 and 36. Of course it will be readily apparent that the length of band 32 is such that when band-apertures 38 and 40 align over their respective skirt-bores, the band is relatively taut on handlebar 14.

A bolt 42 has one end 42a defined by a conical taper. This taper is complementary to the taper of bore 36. A cap or bolt head 42b is formed on end 42a, and, an Allen socket 44 is placed in the outboard portion of head 42b as shown. Head 42b is sized slightly larger and thus overlaps or covers aperture 40 in a band 32. Hence, as bolt end 42a is received in both band-aperture 40 and skirt-bore 36, head 42b engages the strap and drives it firmly onto land 30. A sleeve 46 is formed with a cap or enlarged end 48. The sleeve is sized complementary to bore 34 and is designed to be received therein. An Allen socket 48a is formed in cap 48 as shown. Sleeve 46 is sized to fit into aperture 38 although cap 48 is sized slightly larger than, and thus covers, this last-mentioned aperture. The internal periphery of sleeve 46 is threaded and sized to receive bolt 42. It should be apparent now that when bolt 42 is tightened into sleeve 46 by means of a respective Allen wrench in sockets 44 and 48a, the relative displacement of sleeve 46 on bolt 42 causes bolt cap 42b and sleeve cap 48 to drive associated band seats 32a and 32b into firm engagement with handlebar 14. Continued tightening of sleeve 46, or, the turning of same relative to bolt 42, firmly pinches the ends of band 32 onto their respective strap-receiving lands 28 and 30. As the bolt and sleeve combination is tightened further, band 32 becomes tensioned. The tension in band 32 reacts against housing 12. This reaction secures housing 12 on handlebar 14.

As is common in the art, housing 12 is designed to carry a handbrake lever 50. Handbrake lever 50 is supported by, and pivots relative to, housing 12 by means of a pivot pin 52. A resilient pad 50a is appropriately positioned inside of housing 12 such that it acts as a stop or cushion for brake lever 50. A conventional Bowden cable system is employed with brake lever 50. This Bowden cable system includes an outer sheath or jacket 54 one end of which is secured to housing 12 by means of a jacket cap 54a. A brake cable 56 is strung through jacekt 54 such that the cable is adapted to move therein and relative thereto. One end of cable 56 is formed with a coupling means or key 58. A pin 60 is formed with an enlarged central body part 62. Part 62 is designed to receive coupling means 58. Thus, when brake lever 50 is caused to pivot relative to housing 12, brake cable 56 is lengthened or shortened relative to cable sheath 54. This action results in brake operation.

A gear shift lever 64 has one end formed as a shift barrel or shift disc 66. As seen best in FIG. 2, shift barrel 66 has two opposed faces one of which is, preferably, planar and the other of which includes a conically configured counter-sunk portion 68. An axially aligned mounting-aperture 70 communicates between these two faces. The rim of barrel 66 is formed with an annular groove 66a. The other end of shift lever 64 flares to form a flattened finger paddle or handle 72.

A cavity or chamber 74 is formed within housing 12. Chamber 74 is generally defined by two confronting planar walls 12c and 12d. A bearing-aperture 76 is formed in cavity wall 12c. A threaded support aperture 78 is formed in cavity wall 12d and, as seen best in FIGS. 1 and 2, apertures 76 and 78 align along a common axis. Housing 12 is further defined by a window or slot 80. Slot 80 is formed contiguous to cavity 74 and in suitable alignment therewith. In the embodiment shown, the two longer, parallel opposed walls of slot 80 are each defined by a respective flange 82 and 84. Each flange extends from housing 12. Flange 82 defines a relatively larger thumb flange, and flange 84 defines a relatively smaller guide flange. During operation of the invention as will be described below, a portion of shift lever 64 moves or commutates in slot 80 in response to manual pressure on handle 72.

Shift barrel 66 is sized to fit in cavity 74. The shift barrel is pivotally supported by, and adapted for controlled rotation on, a shift bolt 86. As seen best in FIG. 4, shift bolt 86 has one end formed as a cap 86a. Bolt 86 has a body portion 86b that is threaded. The other end of bolt 86 is formed as a pivot-pin portion 86c. In the embodiment shown and in the region where bolt body 86b becomes pin portion 86c, there is defined an abrupt discontinuity of cross-section or shoulder 86d. An Allen socket 86e is formed in cap 86a as shown. To mount the shift lever in housing 12, shift barrel 66 is guided through slot 80 and into cavity 74. A pivot washer 88 having a central aperture is interposed between the aforementioned planar face of the shift barrel and cavity wall 12c. A generally flat biasing-washer 90 is sized complementary to the annular cross-section of shift barrel or shift disc 66. Biasing-washer 90 is formed with a central aperture that is adapted to receive pin portion 86c of bolt 86, although this central aperture is sized slightly smaller than the cross-sectional area of bolt shoulder 86d. Biasing-washer 90 is dimensioned so as to fit in depression 68 of shift barrel 66. Bolt 86 is directed and threaded into tapped aperture 78. As bolt 86 is threaded into aperture 78, pin portion 86c is directed through the aperture in biasing-washer 90. Continued turning of bolt 86 relative to wall aperture 78 drives pin portion 86c into aperture 70 of shift barrel 66, and such turning drives pin portion 86c into the aperture of pivot washer 88. As bolt 86 moves in and relative to housing 12, pin portion 86c is eventually received in bore 76. With this construction and as the shift barrel mounts in cavity 74, shift paddle 72 is caused to extend clear of housing 12 yet depending therefrom.

A Bowden cable system is used in conjunction with shift lever 64. Thus, one end of a Baldwin shift cable 92 wraps partways around rim groove 66a. This end of cable 92 is then coupled to shift lever 64 by means of a key 94. A cable guide or portal 96 is appropriately aligned relative to rim groove 66a so as to receive and guide cable 92 through housing 12 as the cable proceeds off of this rim groove. Guide 96 includes a seat 98 against which abuts and attaches a cable sheath 100.

In the embodiment shown, a means for locking bolt 86 in cavity wall 12d includes a tapped aperture 102 that communicates with threaded support bore 78. A set-screw 104 is adapted to thread into tapped aperture 102 and abut against bolt 86. Set-screw 104 engages the periphery of bolt 86 and holds same stationary during operation of the invention as will be described now.

In operation, and to place a controlled drag on shift lever 64, or more precisely, to place the drag on shift barrel 66, bolt 86 is threaded or turned into threaded support aperture 78. Movement of bolt 86 in and relative to aperture 78 drives bolt shoulder 86d against the confronting surface of washer 90. Washer 90 is, in turn, driven into and against conical depression 68 of shift barrel 66. Under influence of washer 90, shift barrel 66 is driven into a pressured engagement against the confronting face of pivot washer 88. The other end opposite face of this last-mentioned washer is driven against housing wall 12c. Housing wall 12c reacts against pivot washer 88. In this manner shift barrel 66 is compressively loaded between washers 88 and 90 while the shift barrel is supported on pin portion 86c of bolt 86. It will be apparent that in the aforementioned loaded condition, shift barrel 66 is adapted for controlled rotation on pin portion 86c.

The loading placed on shift barrel 66 is proportional to the loading placed on washer 90. And, the loading placed on washer 90 is, in turn, proportional to the axial displacement of bolt 86 relative to, and in, threaded aperture 78. When the proper loading or frictional drag is placed on shift barrel 66, set-screw 104 is threaded into tapped aperture 102 and driven against bolt 86. This locks bolt 86 in aperture 78. Because bolt 86 is thus immobilized, the drag placed on shift barrel 66 will remain fixed at a given preset level for substantially all vibrational conditions.

To shift gears, the rider manually pivots paddle 72. Appropriately directed rotative displacement of paddle 72 operates in conjunction with shift lever 64 to provide the mechanical advantage necessary to overcome the controlled drag placed on shift barrel 66. Rotation of shift lever 64 relative to housing 12 produces a lengthening or shortening of shift cable 92 relative to cable jacket 100 and thus a gear change.

The drag placed on shift barrel 66 is set or maintained at a level that prevents unwanted or free-wheeling movement of shift lever 64. This insures that shifting occurs only in response to manual pressure on the finger paddle. Flange 82 operates to provide a comfortable finger stop and it, in conjunction with smaller flange 84, impedes unwanted finger contact with shift lever 64.

Once the drag on the shift barrel is set at a proper level, it will not, normally, have to be readjusted. In time, and as the need arises, set-screw 104 can be loosened to allow loading compensations to be made on shift barrel 66 by appropriately directed rotative displacement of bolt 86 relative to aperture 78.

While only one embodiment of the present invention has been shown and described, it is to be understood that many changes and modifications can be made hereto without departing from the spirit and scope hereof.

What is claimed is:

1. A shift apparatus and integral handbrake assembly adapted to mount on a handlebar comprising a handbrake housing on which pivots a handbrake lever, said housing being formed with a slot and having an interior region formed with a cavity, a flange integral with said housing and extending from the external periphery thereof, and flange being disposed on said housing so as to define a wall portion of said slot, a shift lever having one end formed as a shift barrel and the other end formed as a finger paddle, said shift barrel adapted to mount pivotally in said cavity, the last-mentioned mounting being such that a portion of said shift lever is disposed through said slot contiguous to said flange thereby to place said finger paddle extending from said housing, means for coupling said shift lever to a Bowden cable, means for placing a preset and controlled frictional drag on said shift barrel, and means for locking said frictional drag means at a given preset level whereby manual pressure on said finger paddle overcomes the drag placed on said shift barrel causing same to pivot thereby to effect a relative lengthening or shortening of the Bowden cable.

2. The apparatus of claim 1, means for demountably attaching said housing to the handlebar, said demountable attachment means including means adapted to wrap around the handlebar and react on said housing thereby to urge said housing into a firm engagement with the handlebar.

3. The apparatus of claim 1, aperture means disposed in said housing and communicating with said cavity, said frictional drag means including a bolt adapted to be threadably received in said aperture means, a bore axially disposed through said shift barrel, said bore adapted to receive said bolt and thereby pivotally transfix said shift barrel in said cavity, said bolt adapted to drive and shift barrel into a pressured engagement against one wall of said cavity thereby placing the controlled drag on said shift barrel.

4. The apparatus of claim 3, said shift barrel being defined by two faces one of which is formed with a depression, biasing-washer means adapted to seat in said depression, said bolt adapted to drive said biasing-washer means into said depression and thereby place the controlled drag on said shift barrel.

5. The apparatus of claim 3, said locking means including set-screw means, a tapped aperture in said housing, said tapped aperture adapted to threadably receive said set-screw means and communicate with said aperture means whereby said set-screw means can engage said bolt to lock same in said aperture means.

6. A shift mechanism and handbrake assembly particularly for bicycles including a handbrake housing, means for coupling said housing to the bicycle handlebar, a handbrake lever adapted for pivotal rotation relative to said housing, said housing having an interior region in which is formed a chamber, slot means formed in said housing and communicating with said chamber, a flange integrally formed on the external periphery of said housing and extending outwardly therefrom, said flange defining a wall portion of said slot means and providing a comfortable finger stop, a shift lever having one end formed as a shift barrel and the other end formed as a finger paddle, said shift barrel adapted to mount pivotally in said chamber, the mounting of said shift barrel being such that a portion of said shift lever is disposed in said slot means thereby to place said finger paddle out of and extending from said housing, means for placing a controlled frictional drag on said shift barrel, and means for coupling a Bowden cable to said shift lever such that pivoting said finger paddle operates to overcome the frictional drag placed on said shift barrel and thereby cause the Bowden cable to move relative to a Bowden cable jacket.

7. A shift mechanism and handbrake assembly for a bicycle comprising a handbrake housing on which pivots a handbrake lever, means for coupling said housing to the bicycle handlebar, said housing having an interior region in which is formed a cavity, a window defined in said housing and communicating with said cavity, a shift lever having one end adapted to mount pivotally in said cavity, the other end of said shift lever being formed as a finger paddle, the mounting of said one end of said shift lever being such as to place a portion of said shift lever in said window thereby to orient said finger paddle clear of and extending from said housing, flange means integrally formed on the external periphery of said housing and extending outwardly therefrom, said flange means including a first, relatively larger flange defining a wall of said window, and a second, relatively smaller flange spaced from said first flange and defining another wall of said window, said flanges providing a comfortable finger stop and impeding unwanted finger contact with said shift lever, means for placing a preset drag on said one end of said shift lever, means for locking said preset drag means at a given preset level, and means for coupling a Bowden cable to said shift lever such that pivoting said finger paddle operates to overcome the drag placed on said one end of said shift lever and thereby cause a lengthening or shortening of the Bowden cable relative to a Bowden Cable jacket.

8. The shift mechanism and handbrake assembly of claim 7, said one end of said shift lever comprising a shift barrel, the preset drag being placed on said shift barrel.

9. A shift apparatus and integral handbrake assembly adapted to mount on a handlebar comprising a handbrake housing on which pivots a handbrake lever, said housing being formed with a slot and having an interior region formed with a cavity, a flange integral with said housing and extending outwardly therefrom, said flange being disposed on said housing so as to define a wall portion of said slot, a shift lever having one end adapted to mount pivotally in said cavity, the other end of said shift lever being formed as a finger paddle, the mounting of said one end of said shift lever being such that a portion of said shift lever is disposed through said slot contiguous to said flange thereby to place said finger paddle extending from said housing, means for coupling said shift lever to a Bowden cable, and means for placing a preset and controlled frictional drag on said one of said shift lever whereby manual pressure on said finger paddle overcomes the drag placed on said one end of said shift lever causing same to pivot thereby to effect a relative lengthening or shortening of the Bowden cable.

10. The assembly of claim 9, means for locking said frictional drag means at a given preset level.

* * * * *

UNITED STATES PATENT AND TRADEMARK OFFICE
CERTIFICATE OF CORRECTION

PATENT NO. : 4,132,296
DATED : January 2, 1979
INVENTOR(S) : Joel Evett

It is certified that error appears in the above-identified patent and that said Letters Patent are hereby corrected as shown below:

Col. 4, line 56, "Baldwin" should read -- Bowden --;
Col. 5, line 12, "end" should read -- and --;
Col. 5, line 65 (Claim 1), "and" should read -- said --;
Col. 6, line 25 (Claim 3), "and" should read -- said --;
Col. 8, line 18 (Claim 9), after "one" insert -- end --.

Signed and Sealed this

Fifteenth Day of May 1979

[SEAL]

Attest:

RUTH C. MASON
*Attesting Officer*

DONALD W. BANNER
*Commissioner of Patents and Trademarks*